(12) United States Patent
Jung et al.

(10) Patent No.: US 8,767,048 B2
(45) Date of Patent: Jul. 1, 2014

(54) IMAGE PROCESSING METHOD AND APPARATUS THEREFOR

(75) Inventors: Kil-soo Jung, Osan-si (KR); Dae-jong Lee, Suwon-si (KR); Hyun-kwon Chung, Seoul (KR); Hye-young Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 12/562,321

(22) Filed: Sep. 18, 2009

(65) Prior Publication Data

US 2010/0165081 A1 Jul. 1, 2010

(30) Foreign Application Priority Data

Dec. 26, 2008 (KR) .................. 10-2008-0134951

(51) Int. Cl.
*H04N 13/02* (2006.01)
(52) U.S. Cl.
USPC ............................................. 348/46
(58) Field of Classification Search
CPC .............................. H04N 13/00; H04N 13/003
USPC ............... 348/42–54; 382/154; 359/462–477; 345/418–419, 422
See application file for complete search history.

(56) References Cited

U.S. PATENT DOCUMENTS

| | | | |
|---|---|---|---|
| 5,870,097 A * | 2/1999 | Snyder et al. ................. | 345/426 |
| 7,262,767 B2 | 8/2007 | Yamada | |
| 7,440,623 B2 * | 10/2008 | Miura et al. .................. | 382/232 |
| 7,573,475 B2 * | 8/2009 | Sullivan et al. ............... | 345/427 |
| 7,639,838 B2 * | 12/2009 | Nims ............................ | 382/103 |
| 2004/0022322 A1 * | 2/2004 | Dye ......................... | 375/240.26 |
| 2006/0061569 A1 | 3/2006 | Yamada | |
| 2008/0150945 A1 * | 6/2008 | Wang et al. ................... | 345/427 |
| 2008/0240549 A1 | 10/2008 | Koo et al. | |
| 2008/0247670 A1 * | 10/2008 | Tam et al. .................... | 382/298 |
| 2009/0116732 A1 * | 5/2009 | Zhou et al. ................... | 382/154 |

(Continued)

FOREIGN PATENT DOCUMENTS

| | | |
|---|---|---|
| EP | 1 742 488 A1 | 1/2007 |
| JP | 2004-200973 A | 7/2004 |

(Continued)

OTHER PUBLICATIONS

Search Report issued on Mar. 5, 2012, in counterpart European Patent Application No. 09179198.8 (in English, 10 pages).

(Continued)

*Primary Examiner* — Chirag R Patel
(74) *Attorney, Agent, or Firm* — NSIP Law

(57) ABSTRACT

An image processing method, including extracting shot information from metadata, wherein the shot information is used to classify a series of two-dimensional images into predetermined units; if it is determined, by using shot type information included in the shot information, that frames classified as a predetermined shot can be reproduced as a three-dimensional image, extracting background depth information from the metadata, wherein the background depth information is about a background of the frames classified as the predetermined shot; generating a depth map about the background of the frames by using the background depth information; if the frames classified as the predetermined shot comprise object, extracting object depth information about the object from the metadata; and generating a depth map about the object by using the object depth information.

34 Claims, 9 Drawing Sheets

(56) References Cited

U.S. PATENT DOCUMENTS

| | | | |
|---|---|---|---|
| 2010/0046837 A1* | 2/2010 | Boughorbel | 382/173 |
| 2010/0182410 A1* | 7/2010 | Verburgh et al. | 348/51 |
| 2010/0220920 A1* | 9/2010 | Barenbrug | 382/154 |

FOREIGN PATENT DOCUMENTS

| | | |
|---|---|---|
| JP | 2005-151534 A | 6/2005 |
| JP | 2008-148183 A | 6/2008 |
| WO | WO 2007/055865 A1 | 5/2007 |
| WO | WO 2008/139351 A1 | 11/2008 |
| WO | WO 2008/150111 A1 | 12/2008 |

OTHER PUBLICATIONS

Japanese Office Action mailed on Oct. 15, 2013 in counterpart Japanese Application No. 2009-289749 (5 pages, in Japanese, with complete English translation of the substantive portion).

Chinese Office Action issued in counterpart Chinese Application No. 200910265262.X (15 pages, in Chinese, with complete English translation).

* cited by examiner

# IMAGE PROCESSING METHOD AND APPARATUS THEREFOR

CROSS-REFERENCE TO RELATED APPLICATION

This application claims the benefit of Korean Application No. 10-2008-0134951, filed in the Korean Intellectual Property Office on Dec. 26, 2008, the disclosure of which is incorporated herein by reference.

BACKGROUND OF THE INVENTION

1. Field of the Invention

Aspects of the present invention relate to an image processing method and apparatus therefor, and more particularly, to an image processing method and apparatus therefor which generate a depth map about a frame by using depth information extracted from metadata.

2. Description of the Related Art

Due to the development of digital technologies, three-dimensional image technology has become widespread. Three-dimensional image technology aims to realize a realistic image by applying depth information to a two-dimensional image.

Since human eyes are separated in a horizontal direction by a predetermined distance, two-dimensional images respectively viewed by the left eye and the right eye are different from each other so that binocular disparity occurs. The human brain combines the different two-dimensional images, and thus generates a three-dimensional image that looks realistic.

Three-dimensional image technology is generally classified into an image generating technique for generating video data as a three-dimensional image from the start, and an image converting technique for converting video data, which is generated as a two-dimensional image, into a three-dimensional image. In this regard, research is being conducted to study both of these two techniques.

SUMMARY OF THE INVENTION

Aspects of the present invention provide an image processing method and apparatus therefor which generate a depth map about an object based on background depth information.

According to an aspect of the present invention, an image processing method is provided. The method includes extracting shot information from metadata, wherein the shot information classifies a series of two-dimensional images into predetermined units; determining whether frames classified as a predetermined shot can be reproduced as a three-dimensional image based on shot type information included in the shot information; extracting background depth information from the metadata if the frames classified as the predetermined shot can be reproduced as a three-dimensional image, wherein the background depth information relates to a background of the frames classified as the predetermined shot; generating a depth map about the background of the frames based on the background depth information; if the frames classified as the predetermined shot comprise an object, extracting object depth information about the object from the metadata; and generating a depth map about the object based on the object depth information.

According to another aspect of the present invention, the image processing method may further include calculating a time at which the frames classified as the predetermined shot are required to be output based on the shot information. The generating of the depth map about the background may include extracting information from the background depth information, the information including background type information indicating a basic composition of the background, surface information for applying a depth value to a surface included in the background, coordinate points of the background, a depth value at each of the coordinate points of the background, and a panel position value indicating a depth value of a screen.

According to another aspect of the present invention, the generating of the depth map about the background may include generating the depth map about the background based on a depth value of the basic composition of the background according to the background type information, and a depth value of the surface according to the surface information.

According to another aspect of the present invention, the image processing method may further include filtering the depth map about the background if the background of the frames have the same depth values, and the filtering of the depth map about the background includes applying a hemisphere-shaped filter, a hemicylinder-shaped filter, or a triangular prism-shaped filter to the depth map about the background so as to modify the depth map of the background. The object depth information may include object type information identifying a type of the object as a two-dimensional object, a normal object, or a highlight object.

According to another aspect of the present invention, if a frame includes a plurality of objects, the object depth information may include priority order information indicating a depth map generation order for the plurality of objects, and the generating of the depth map about the object may include sequentially generating depth maps about the plurality of objects according to the depth map generation order. The generating of the depth map about the object may include obtaining a time at which the frames including the object are required to be output based on the object depth information.

According to another aspect of the present invention, the image processing method may further include extracting area identification information identifying an area of the object from the object depth information, wherein the area identification information corresponds to information in which the area of the object is denoted as a coordinate point, or corresponds to a mask in which a shape of the object is marked. If the object is a two-dimensional object, the generating of the depth map about the object may include the generating a depth map about the two-dimensional object based on the panel position value included in the background depth information that is determined based on a depth value of the area of the object.

According to another aspect of the present invention, if the object is a normal object and the area identification information corresponds to the mask in which the shape of the object is marked, the object depth information may further include information about one or more background coordinate points from among coordinate points of the background included in the background depth information and which are equal to one or more coordinate points indicating an area of the normal object, and generating of the depth map about the object may include the operation of generating a depth map about the normal object based on depth values of the one or more background coordinate points that are determined based on depth values of the area of the normal object.

According to another aspect of the present invention, if the object is a normal object, the generating of the depth map about the object may include obtaining one or more background coordinate points from among coordinate points of the background included in the background depth information and which are equal to coordinate points indicating an area of the normal object; and generating the depth map about the normal object based on depth values of the background coordinate points that are determined based on depth values of the area of the normal object. If the object is a highlight object, the operation of generating the depth map about the object may include the calculating a depth value of an area of the highlight object based on the panel position value included in the background depth information and an offset value included in the object depth information, and generating a depth map about the highlight object based on the a depth value of the area of the highlight object.

According to another aspect of the present invention, the image processing method may further include filtering the depth map about the object, and the operation of filtering may include applying a hemisphere-shaped filter, a hemicylinder-shaped filter, or a triangular prism-shaped filter to the depth map about the object so as to modify the depth map about the object.

According to another aspect of the present invention, the image processing method may further include extracting title identification information from the metadata, wherein the title identification information identifies a title including the frames, and thus determines which title is related to the metadata. The image processing method may further include generating a left-eye image and a right-eye image with respect to the two-dimensional image based on the depth map about the background and the depth map about the object; compensating for holes of the left-eye image and the right-eye image; and generating a three-dimensional format image based on the left-eye image and the right-eye image of which holes are compensated for.

According to another aspect of the present invention, an image processing apparatus is provided. The image processing apparatus includes a metadata analyzing unit to extract shot information from metadata, based on shot type information included in the shot information, the shot information classifying a series of two-dimensional images into predetermined units, to extract background depth information from the metadata when frames classified as a predetermined shot can be reproduced as a three-dimensional image, the background depth information relating to a background of the frames classified as the predetermined shot, and to extract and analyze object depth information about the object from the metadata when the frames classified as the predetermined shot include the object and a depth map generating unit to generate a depth map about the background of the frames based on the background depth information, and to generate a depth map about the object based on the object depth information.

According to another aspect of the present invention, there is provided a recording medium storing a computer readable program to execute an image processing method, the image processing method including extracting shot information from metadata, wherein the shot information classifies a series of two-dimensional images into predetermined units; determining whether frames classified as a predetermined shot can be reproduced as a three-dimensional image based on shot type information included in the shot information; extracting background depth information from the metadata if the frames classified as the predetermined shot can be reproduced as a three-dimensional image, wherein the background depth information relates to a background of the frames classified as the predetermined shot; generating a depth map about the background of the frames based on the background depth information; if the frames classified as the predetermined shot comprise an object, extracting object depth information about the object from the metadata; and generating a depth map about the object based on the object depth information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
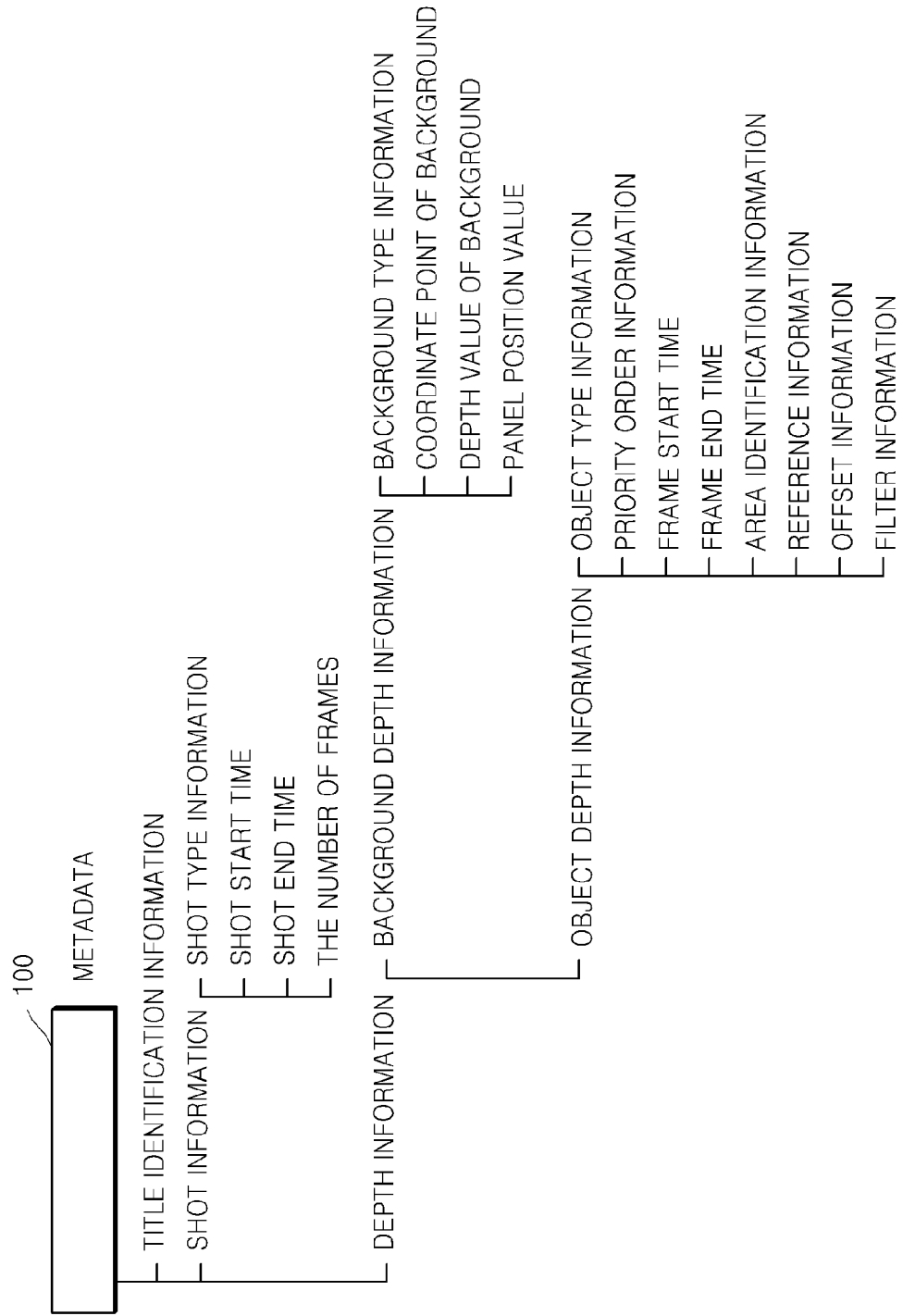
FIG. 1 illustrates metadata about video data, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram of metadata 100 about video data, according to an embodiment of the present invention. The metadata 100 includes information about the video data. In order to indicate which video data is related to the metadata 100, the metadata 100 includes title identification information identifying a title including the video data.

The metadata 100 includes information about the frames comprising the video data. The information about the frames includes information classifying the frames according to a predetermined reference. A group of similar frames may be referred to as a 'unit', and the frames of the video data may be classified into a plurality of such units. The metadata 100 includes information classifying the frames of the video data into the plurality of units.

According to aspects of the present invention, when the composition of a current frame can be estimated based on a previous frame due to similar composition, a series of frames having such similar composition is referred to as a 'shot'. The metadata 100 includes information about a shot so as to classify frames of two-dimensional video data into predetermined units, that is, shot units. Hereinafter, the information about the shot included in the metadata 100 is referred to as 'shot information'. The metadata 100 includes shot information for one or more shots. Where the composition of frames changes significantly, such that the composition of a current frame is different from the composition of a previous frame, the current frame and the previous frame are classified into different shots.

The shot information includes shot type information, which is related to each of the shots, and indicates whether frames corresponding to the shot need to be output as a two-dimensional image or a three-dimensional image. When shot type information about a shot indicates that frames included in the shot should be output as a two-dimensional image, an image processing apparatus (not shown) decodes the frames corresponding to the shot, and outputs the two-dimensional image on a screen of the image processing apparatus. When shot type information about a shot indicates that frames included in the shot should be output as a three-dimensional image, the image processing apparatus outputs the frames corresponding to the shot as the three-dimensional image based on depth information included in the metadata 100.

The shot information includes information for synchronizing two-dimensional video data with depth information in order to output the two-dimensional video data as a three-dimensional image. The shot information includes a shot start time and a shot end time. The shot start time indicates an output time at which a first frame of the shot is output, and the shot end time indicates an output time at which the last frame of the shot is output. When video data or a title, which is a group of video data, is sequentially reproduced along a single time axis, a sequential time axis in which the video data or the title is reproduced is referred to as a 'global time axis'. A presentation time of the video data or the title in the global time axis can be used as the shot start time and shot end time.

The shot information includes information indicating the number of frames included in the shot. Since the shot information includes the shot start time and the shot end time and also includes the information about the number of frames included in the shot, the image processing apparatus outputs the frames included in the shot at regular intervals during a time period calculated by subtracting the shot start time from the shot end time. Thus, an output time of each of the frames included in the shot is calculated.

When shot type information about a predetermined shot indicates that frames classified by the predetermined shot should be output as a three-dimensional image, the metadata 100 may further include depth information for converting the frames classified by the predetermined shot into the three-dimensional image.

In order to give a three-dimensional effect to a two-dimensional image, depth should be given to the two-dimensional image. When a viewer watches a screen, an image projected on the screen is formed on the eyes of the viewer, and in this regard, a distance between two points in the image formed on the eyes is referred to as 'parallax', which is divided into positive parallax, zero-parallax, and negative parallax. Positive parallax indicates that the image appears to be within the screen itself. A parallax value of the positive parallax may be equal to or less than a distance between the eyes. As the parallax value increases, the three-dimensional effect is generated so that the image appears to be positioned deeper in the screen.

Where the image is formed at the plane of the screen two-dimensionally, the parallax value is 0. When the parallax value is 0, the image is formed at the plane of the screen so that the viewer does not experience a three-dimensional effect. Negative parallax indicates that the image is formed in front of the screen when the visual axes of the two eyes are crossed in front of the screen, and creates a three-dimensional effect so that the image appears to be protruding from the screen.

In order to generate a three-dimensional image by giving depth to a two-dimensional image, aspects of the present invention may employ a method of giving depth to a frame by generating a depth map about the frame. Depth information indicates information for converting the two-dimensional image into the three-dimensional image by giving depth to the frame, and includes background depth information and object depth information.

An image of a background and an image of one or more objects other the background together comprise an image of a frame. The background depth information gives depth to the image of the background. Giving depth to the image of the background refers to giving depth to the composition so as to allow the background to have a three-dimensional effect, wherein the composition includes a position of the background, a structure of a shape of the background, and the like.

A background of a frame may have various forms for each frame. The various forms are classified into several types and included in the metadata 100. The metadata 100 also includes background type information for indicating which type of composition from among the classified compositions is related to a background of frames included in a predetermined shot. According to aspects of the present invention, the shot is used to distinguish frames in the case where the composition of a current frame is different from the composition of a previous frame because the composition is changed between frames. Frames classified by shot generally have a similar composition. Hence, depth information about a background of the frames classified by the shot is also similar.

In addition to the basic composition indicated by the background type information, the background depth information may further include surface information for giving a depth value to a surface included in the background. The background type information and the surface information will be described with reference to FIG. 3F.

The background depth information may include coordinate points of the background, a depth value applied to each of the coordinate points of the background, and a panel position value. Values of the coordinate points indicate coordinate values of the background with respect to a two-dimensional image frame. The depth value indicates a degree of depth to be given to a predetermined pixel of the two-dimensional image, and a panel position indicates a position in the screen at which an image is formed. When the shot type information about a shot indicates that frames classified by the shot should be output as a three-dimensional image, the background depth information may be employed to generate a depth map about a background of the frames included in the shot.

In a frame, an object other than a background indicates a person, a building, and the like, which have a vertical component. The object depth information may be used to generate a depth map about the object. Where the frames included in the shot should be output as the three-dimensional image, the background depth information may be necessary, but some of the frames in the shot may not include the object, thus, not every frame may need to be output, since the three-dimensional image may require the object depth information.

The object depth information includes object type information. The object type information is classified into a two-dimensional object, a normal object, and a highlight object, according to how the depth value is applied to the object. A two-dimensional object identifies an area to be two-dimensionally output. A depth value of the two-dimensional object is equal to a depth value of the screen, that is, the panel position value. A normal object is an object in contact with the background. Thus, the normal object has a depth value equal to a depth value of a coordinate point of the background and which contacts the normal object. Objects that are neither two-dimensional objects nor normal objects are referred to as highlight objects. Highlight objects have a depth value equal to a value of a point inwardly or outwardly positioned in the screen by a predetermined value with respect to a depth value of the panel position.

The object depth information includes priority order information. Where a frame includes a plurality of objects, the priority order information indicates a depth map generation order for the plurality of objects. A depth map is first generated with respect to an object having the highest priority of the plurality of objects. An object having a high priority is an object that is positioned closer to a viewer than other objects with lower priority.

The object depth information may also include information on a time at which a frame is output. The time at which the frame is output indicates a frame output time at which a predetermined object is shown from among frames of the shot. The frame output time includes a frame start time and a frame end time which respectively indicate a time at which an output of the frame including the predetermined object begins and a time at which an output of the frame including the predetermined object ceases.

The object depth information includes area identification information. The area identification information identifies an area of an object and may be coordinate points. According to another aspect of the present invention, the area identification information may be a mask in which the area of the object is marked. In this case, a single mask is used for a single object so as to identify an area of the single object.

Where the object is the normal object and the area identification information is the mask, the object depth information may further include reference information. The reference information relates to a coordinate point equal to a coordinate point of the background included in the background depth information that indicates an area of the normal object. As described above, the normal object indicates an object contacting the background, so that the normal object has an object depth value equal to a background depth value at the coordinate point contacting the background. However, if the mask is used as the area identification information, it may not be possible to know which part of the object contacts the background, so that the reference information is necessary to indicate the part of the object that contacts the background.

Where the object is the highlight object, since the depth value of the highlight object corresponds to a sum of or a difference between the panel position value and an offset value, the object depth information may need to include information about the offset value as well.

The object depth information may further include filter information. Since the object has a vertical component, depth values of all pixels of the object may be vertically even with each other. For example, since the depth value of the highlight object corresponds to the sum of, or the difference between, the panel position value and the offset value, all pixels of the highlight object may have the same depth value. In this case, the filter information may be necessary to add an additional depth value to the depth value of the object so as to make the object three-dimensional. The image processing apparatus may filter the object based on the filter information.

According to another aspect of the present invention, the background depth information may include the filter information. Where an entire background has the same depth value, a depth map about the background may be filtered based on the filter information so that a three-dimensional effect may be given to the background. The filter information will be described in detail with reference to FIG. 5.

In this manner, the metadata 100 according to the embodiment of FIG. 1 includes information for converting the video data of the two-dimensional image into the three-dimensional image, and includes the background depth information and the object depth information.

Figure 2:
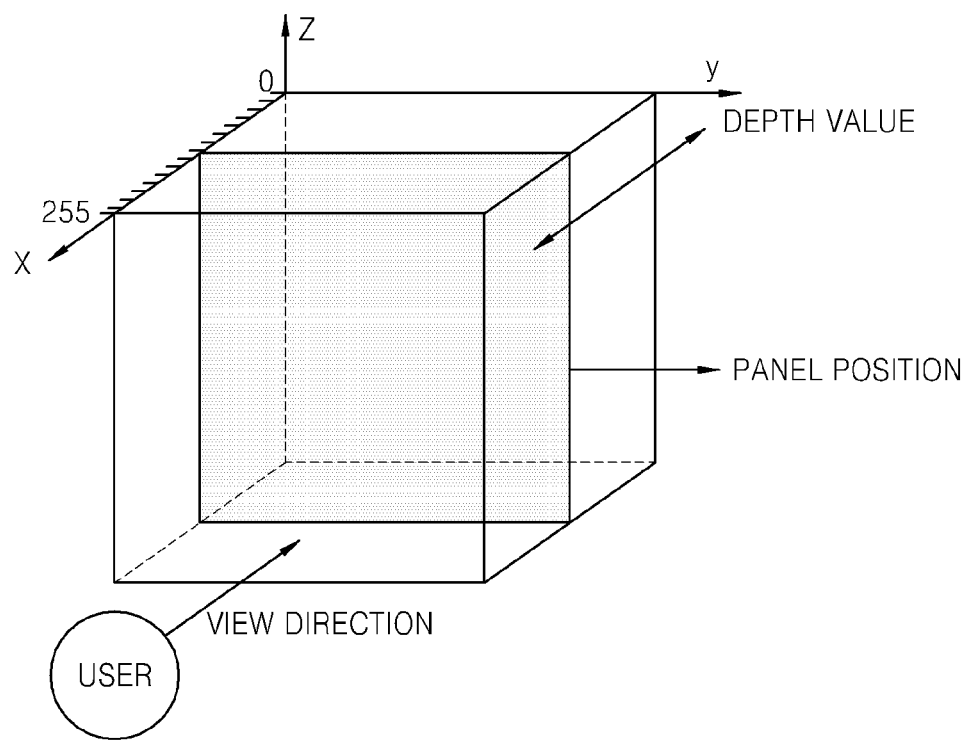
FIG. 2 illustrates depth information shown in FIG. 1.

FIG. 2 illustrates the depth information of FIG. 1. According to aspects of the present invention, the depth information may be used to give depth to a frame of a two-dimensional plane. Referring to FIG. 2, an X-axis direction parallel to a direction in which a viewer watches a screen indicates a degree of a depth of an image of the frame. According to aspects of the present invention, the depth value may have a value between 0 through 255. As the depth value decreases and thus approaches 0, the image has a large depth so that the image is farther from the viewer. As the depth value increases and thus approaches 255, the image is closer to the viewer.

A panel position indicates a position in a screen at which the image is formed, and a panel position value indicates a depth value of the image when parallax is 0, that is, when the image is formed at a plane of the screen. As illustrated in FIG. 2, the panel position value may have a depth value between 0 through 255. If the panel position value is 255, the image included in the frame has a depth value equal to or smaller than a depth value of the screen so that the image is formed far away from the viewer, that is, an inner part of the screen, so that the image included in the frame has the zero-parallax or the positive parallax. If the panel position value is 0, the image included in the frame has a depth value equal to or larger than a depth value of the screen so that the image appears to be coming off the screen, that is, an outer part of the screen, so that the image included in the frame has a zero-parallax or a negative parallax.

FIGS. 3A through 3F illustrate a method of giving a depth value to a background based on the background type information and the surface information included in the background depth information. As described above, the background type information indicates basic composition of the background included in a frame.

A background type may be broadly divided into six types. Table 1 below lists the six background types and FIGS. 3A through 3E correspond to basic compositions of the background according to the background type.

TABLE 1

| | |
|---|---|
| 0x00 | Reserved |
| 0x01 | Plain |
| 0x02 | Basic baseline |
| 0x03 | 2 point baseline |
| 0x04 | 5 point box |
| 0x05 | 6 point box |
| 0x06 | 8 point box |
| 0x07~0xFF | Reserved |

Although not illustrated in FIGS. 3A through 3F, the plain composition may be further included as a background type. The plain composition corresponds to a case where the entire background has the same depth value.

Figure 3A:
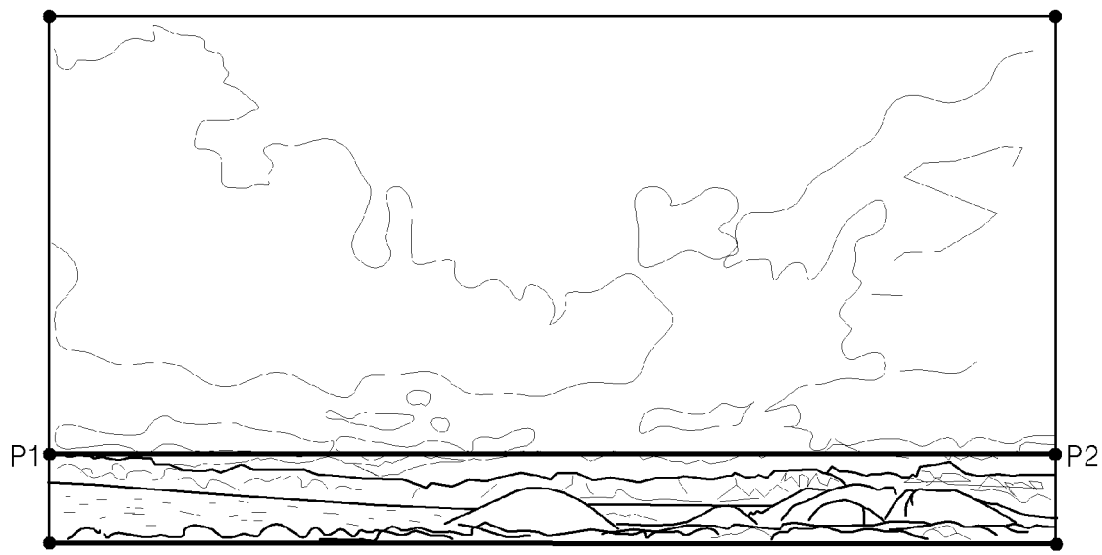
FIGS. 3A through 3F illustrate a method of giving a depth value to a background based on background type information and surface information included in background depth information.

A background of a frame in FIG. 3A illustrates a case where the background type is a basic baseline. The composition of the basic baseline is used when a depth change occurs vertically in upper and lower areas with respect to a single line, such as a horizontal line parallel to a top line or a bottom line in the background. When a coordinate value of an uppermost left point of the frame in FIG. 3A, is (0,0), coordinate points p1 and p2 have coordinate values which are different in the X-axis but equal in the Y-axis. In addition, pixels of a straight line connecting the coordinate points p1 and p2 have equal depth values. When the background type is the basic baseline, depth information includes the coordinate points p1 and p2, a depth value to be applied to the straight line connecting the coordinate points p1 and p2, and depth values of the top line and the bottom line.

Figure 3B:
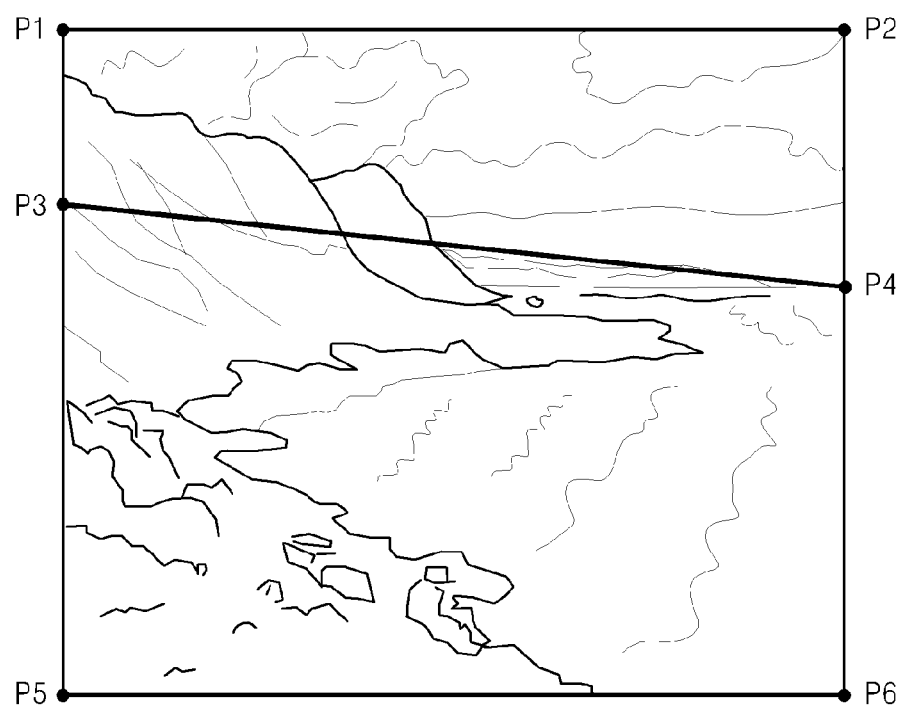

A background of a frame in FIG. 3B illustrates a case of where the background type is a two-point baseline. The composition of the two-point baseline is used when a depth change occurs vertically and horizontally in upper and lower areas with respect to a single line not in parallel with a top line and a bottom line in the background. Coordinate values of coordinate points p3 and p4 in FIG. 3B are different in both X-axis and Y-axis directions, and depth values of the coordinate points p3 and p4 are also different. Pixels of a straight line connecting the coordinate points p3 and p4 have respectively different depth values. When the background type is the two-point baseline, depth information includes coordinate points p3 and p4, the depth values to be applied to the coordinate points p3 and p4, and depth values of corner points p1, p2, p5, and p6.

Figure 3C:
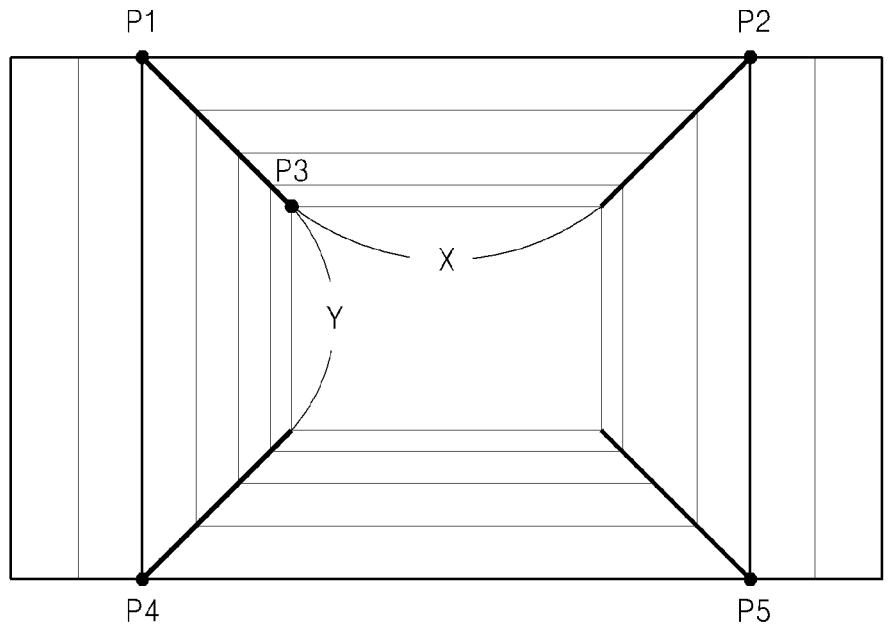

A background of a frame in FIG. 3C illustrates a case where the background type is a five-point box. The composition of the five-point box is used when the same depth area formed as a plane rectangle exists in the background and when a depth change occurs toward four outer points with respect to the plane rectangle. Referring to FIG. 3C, a coordinate point p3, and horizontal and vertical lengths X and Y are given to indicate the rectangle area. When the background type is the five-point box, depth information includes coordinate points p1 through p5, depth values of the coordinate points p1 through p5, and the vertical and horizontal lengths of the plane rectangle.

Figure 3D:
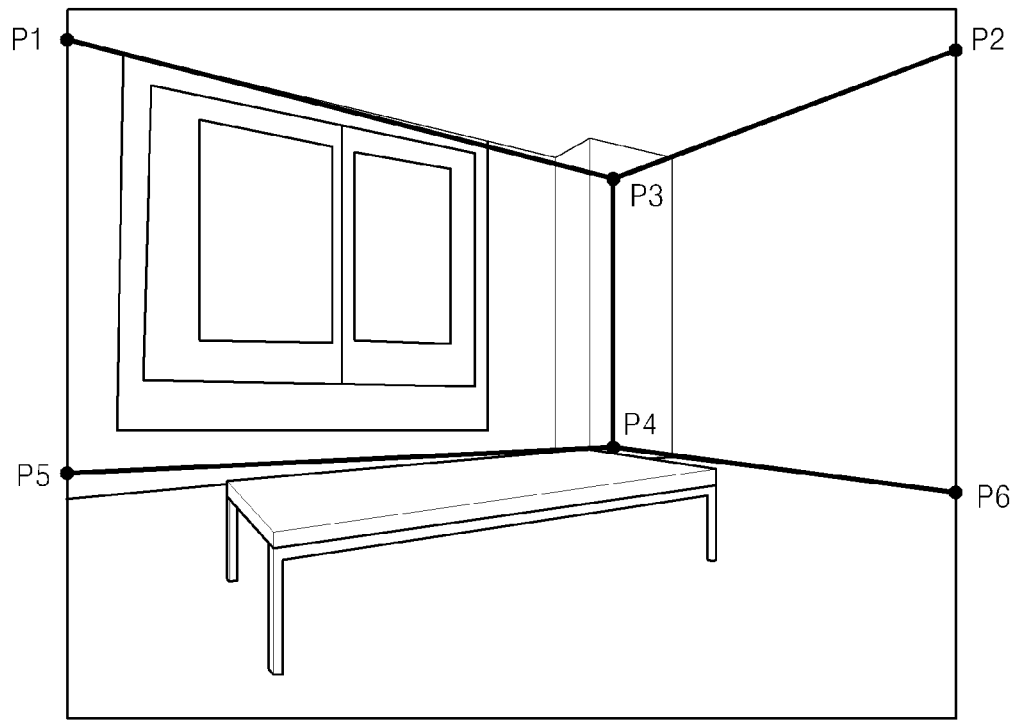

A background of a frame in FIG. 3D illustrates a case where the background type is a six-point box. The composition of the six-point box is used when two specific points which have vertically different depth values are defined in the background and when a depth change occurs toward four outer points with respect to the two specific points. When the background type is the six-point box, depth information includes coordinate points p1 through p6, and depth values of the coordinate points p1 through p6.

Figure 3E:
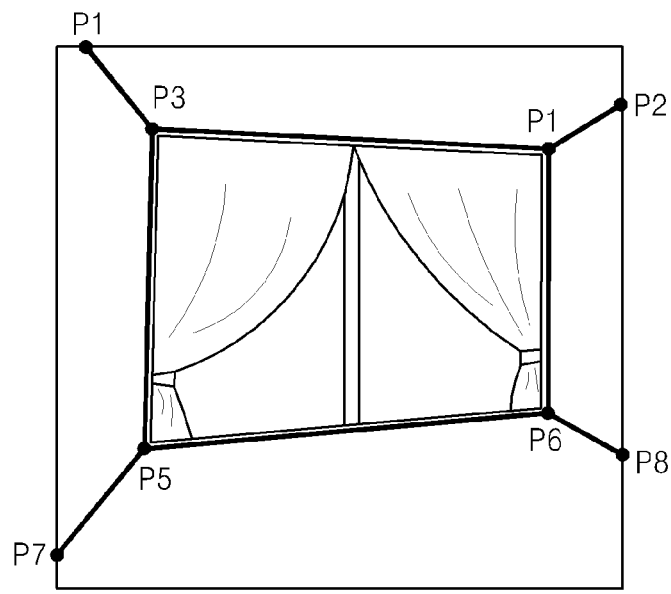

A background of a frame in FIG. 3E illustrates a case where the background type is an eight-point box. The composition of the eight-point box is used when an area formed as a plane quadrangle exists in the background, wherein the plane quadrangle has four corner points each of which has different depth values, and when a depth change occurs toward four outer points with respect to the four corner points. When the background type is the eight-point box, depth information includes coordinate points p1 through p8 and depth values of the coordinate points p1 through p8.

Figure 3F:
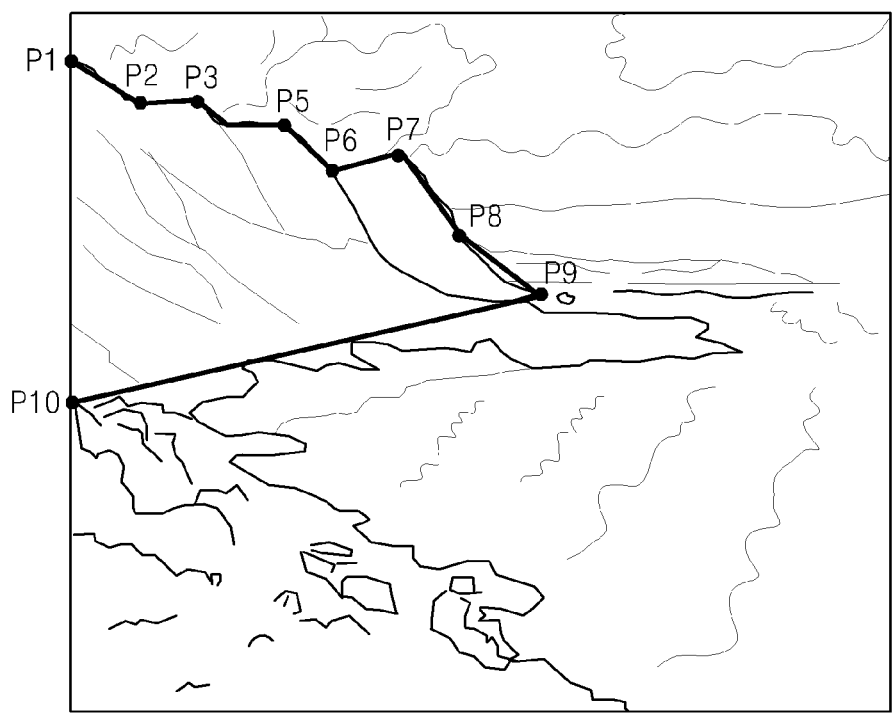

FIG. 3F illustrates a case where a depth value is additionally added to the basic composition of a background according to surface information. FIG. 3F illustrates a coordinate value for additionally adding a depth value to the background having a background composition of a two-point baseline. The surface information includes a value of the coordinate value and a depth value of the coordinate value for additionally adding the depth value to the background. Depth information includes surface information including coordinate points p1 through p10, and depth values of the coordinate points p1 through p10.

Figure 4:
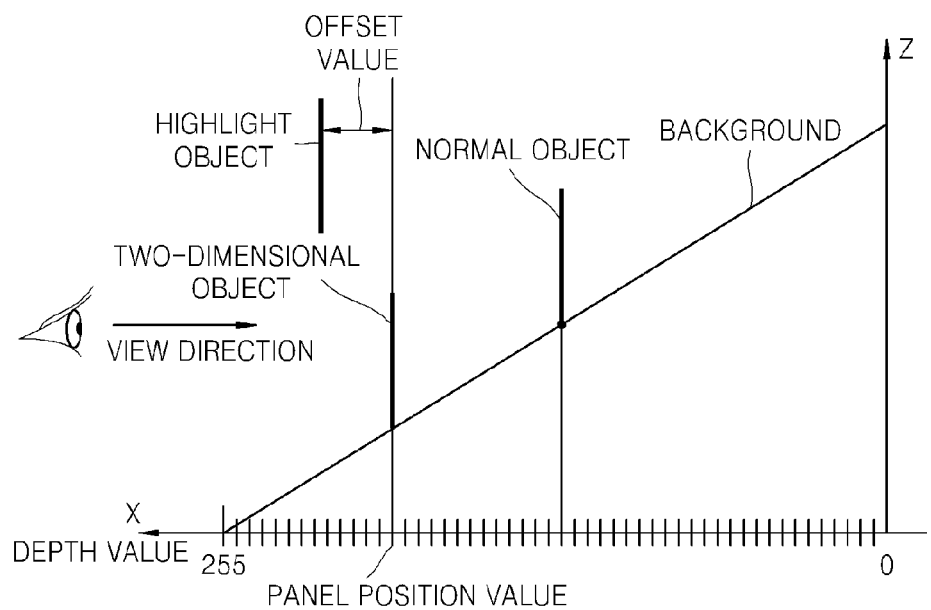
FIG. 4 illustrates a depth given to an image when the image is viewed at a side of a screen.

FIG. 4 illustrates the depth given to an image when the image is viewed at a side of a screen. The image of the screen illustrated in FIG. 4 includes a two-dimensional object, a normal object, and a highlight object. Filtering is not performed on the objects of FIG. 4, and pixels of each of the objects have the same depth values with respect to a Z-axis direction, that is, a direction in parallel with a panel position.

When viewed at the side of the screen, the two-dimensional object is positioned on the screen so that the two-dimensional object has a depth value equal to the screen. Since the normal object stands while contacting a background, as illustrated in FIG. 4, a depth value of the normal object is equal to a depth value at a background point at which the background and the normal object contact each other. The highlight object of FIG. 4 has a depth value corresponding to a sum of a panel position value and an offset value. Since the highlight object has a depth value larger than the panel position value in FIG. 4, a viewer visually senses the highlight object of FIG. 4 as though the highlight object were coming off the screen.

FIG. 5 illustrates a three-dimensional effect of an image filtered when an image processing apparatus filters a depth map about an object or a depth map about a background. When the object is a highlight object and pixels of the object have the same depth values, in order to give the three-dimensional effect to the object, the depth map about the object may be filtered. Also, when all pixels of the background have the same depth value, in order to give the three-dimensional effect to the background which is plain, the depth map about the background may be filtered.

For convenience of description, FIG. 5 illustrates depths viewed from a side when the object or the background is filtered provided that the object or the background has the same depth value. However, the filtering operation is not limited to the case of FIG. 5 and thus may be performed although the object or the background does not have the same depth value.

Figures 5A, 5B, 5C, 5D, 5E, 5F:
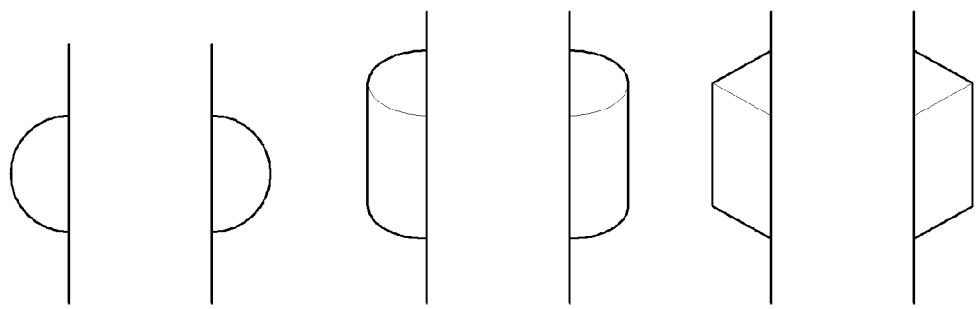
FIGS. 5A-5F illustrate a three-dimensional effect of an image filtered when an image processing apparatus filters a depth map about an object or a depth map about a background.

FIGS. 5A and 5B illustrate depths of a depth map filtered by a hemisphere-shaped filter. FIGS. 5A and 5B correspond to a case where the hemisphere-shaped filter is applied to the depth map in such a manner that a shape of the depth map about the object or a shape of the depth map about the background is a plane that passes through a center of a sphere. For example, if the object is the highlight object such as a soccer ball, in order to give a three-dimensional effect to the soccer ball, a depth map about the soccer ball may be filtered with a hemisphere-shaped filter. Also, if a human face is enlarged in a frame, the human face may be regarded as a separate object but, for convenience of description, when it is assumed that the entire frame including the human face is a background, the hemisphere-shaped filter may be applied to a depth map about the human face so as to give a three-dimensional effect to the human face.

FIGS. 5C and 5D illustrate depths of a depth map filtered by a hemicylinder-shaped filter. FIGS. 5C and 5D correspond to a case where the hemicylinder-shaped filter is applied to the depth map in such a manner that a shape of the depth map about the object or a shape of the depth map about the background may be a plane that vertically divides a cylinder in half. For example, when the object is the normal object and a shape of the object is that of a telephone pole, the hemicylinder-shaped filter may be used to give a three-dimensional effect to the telephone pole.

FIGS. 5E and 5F correspond to a case where a triangular prism-shaped filter is applied to a depth map. As illustrated in FIGS. 5E and 5F, the triangular prism-shaped filter may be applied to the depth map in such a manner that a rectangleshaped side surface of the triangular prism can be in parallel with the depth map. By doing so, the depth map may be modified.

Figure 6A:
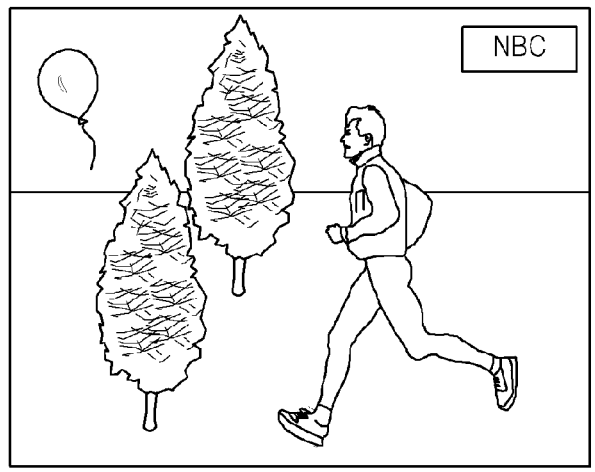
FIGS. 6A and 6B illustrate a method of generating a depth map by using the metadata of FIG. 1.
Figure 6B:
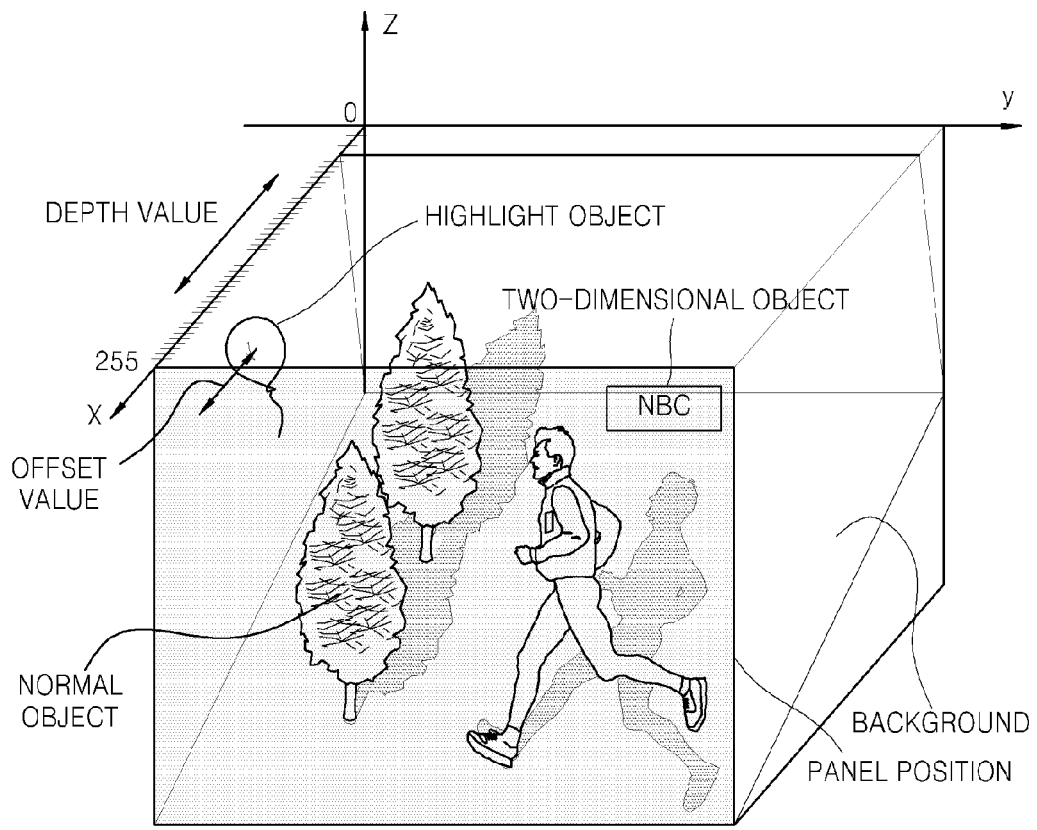

FIG. 6 illustrates a method of generating a depth map by using the metadata 100 of FIG. 1. FIG. 6A illustrates a two-dimensional image, and FIG. 6B corresponds to a case of where a depth value is given to a screen illustrated in FIG. 6A. According to aspects of the present invention, the image processing apparatus (not shown) divides a frame into a background and an object, and generates background depth information and object depth information.

Referring to FIG. 6A, a frame of the two-dimensional image includes a background of land and the sky, and an object including two trees, a person, and a balloon. The image processing apparatus extracts the background depth information from the metadata 100. The frame of FIG. 6A has a composition in which the horizon, that is, a horizontal line, has the largest depth. The image processing apparatus uses the background type information extracted from the metadata 100, and thus recognizes that the frame of FIG. 6A has the background composition of the basic baseline as illustrated in FIG. 3A. The image processing apparatus gives a depth value to the background based on information about a composition type, a coordinate point value of the background, and depth value information about the background, and thus generates a depth map about the background as illustrated in FIG. 6B.

Referring to FIG. 6B, a depth value of a panel position is 255. Since the depth value of the panel position is the largest value, an image of the frame gives a three-dimensional effect by which the image appears to be within a screen. In FIG. 6B, the horizontal line at which the sky contacts the land has a depth value of 0 so that the horizontal line is positioned farthest from a viewer. A bottom line of the land has a depth value of 255, meaning that an image of the bottom line is formed at a position closest to the viewer.

The image processing apparatus extracts coordinate point information from area identification information so as to identify an area of an object, and identifies the object from the frame based on the coordinate point information. The area identification information may be a mask in which a shape of the object is marked, and in this case, the area of the object may be identified based on the mask.

The image processing apparatus determines an object type for each of objects based on object type information included in the object depth information. In the frame of FIG. 6A, the object includes the two trees, the human, a logo titled NBC, and a balloon. Since the two trees and the human contact the land, the two trees and the human are normal objects. Since the logo titled NBC is intended to be displayed on a two-dimensional screen, the logo is a two-dimensional object. Since the balloon is an object floating in the air, the balloon is a highlight object. The image processing apparatus identifies an area of each of the objects by using the area identification information.

With respect to the two-dimensional object, the image processing apparatus generates a depth map about the two-dimensional object as illustrated in FIG. 6B based on the panel position value, which is included in the background depth information. The panel position value may be determined based on a depth value of the two-dimensional object. With respect to the normal object, the image processing apparatus determines one or more points at which the normal object contacts the background, and extracts background depth values corresponding to coordinate point values of the points at which the normal object contacts the background. With respect to the highlight object, the image processing apparatus generates a depth map about the highlight object based on a depth value that is in turn calculated based on the panel position value and the offset value.

After generating the depth maps about the objects, the image processing apparatus may filter the depth maps. For example, the image processing apparatus may give a three-dimensional effect to the balloon in FIG. 6B by applying the hemisphere-shaped filter to the balloon.

As described above, according to aspects of the present invention, the depth maps about the objects may be generated by giving the depth values to the objects based on various methods according to the types of the objects.

Figure 7:
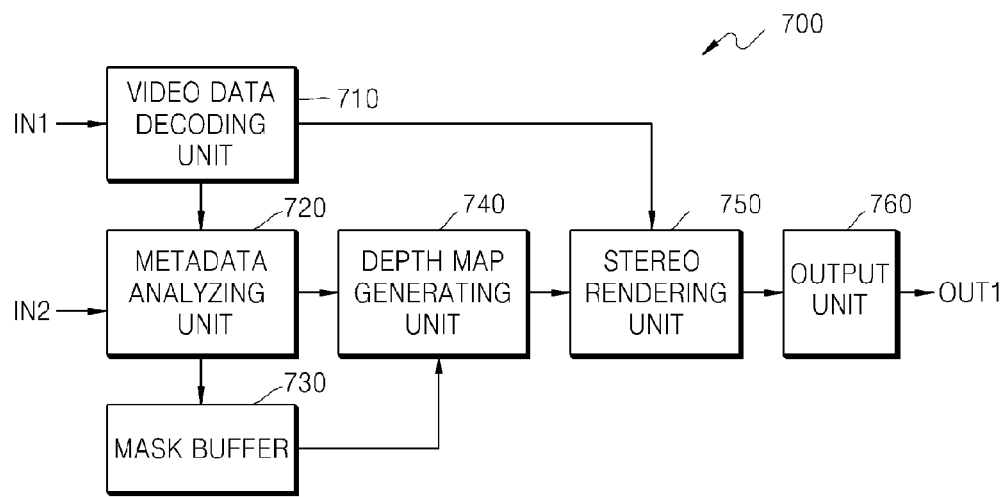
FIG. 7 is a block diagram of an image processing apparatus for performing an image processing method according to an embodiment of the present invention.

FIG. 7 is a block diagram of an image processing apparatus 700 to perform an image processing method according to an embodiment of the present invention. The image processing apparatus 700 includes a video data decoding unit 710, a metadata analyzing unit 720, a mask buffer 730, a depth map generating unit 740, and a stereo rendering unit 750. The image processing apparatus 700 may further include an output unit 760 that outputs a three-dimensional image, which is formed in a three-dimensional format, on a screen. According to other aspects of the present invention, the image forming apparatus may include additional and/or different units. Similarly, the functionality of two or more of the above units may be integrated into a single component.

The video data decoding unit 710 reads video data from a disc (not shown) or a local storage (not shown), and decodes the video data. The metadata analyzing unit 720 reads metadata about video data 100 from the disc or the local storage, and analyzes the metadata about video data 100.

The video data and/or the metadata about video data 100 may be stored in a server (not shown) or recorded to the disc in a multiplexed or independent manner. The image processing apparatus 700 may download the video data from the server and read the metadata about video data 100 from the disc, or may read the video data from the disc and download the metadata about video data 100 from the server.

If the video data and/or the metadata about video data 100 are stored in the server, the image processing apparatus 700 may download and use the video data and/or the metadata about video data 100 from the server via a communication network. The server may be operated by a content provider, such as a broadcasting station or a general content manufacturing company, and stores the video data and/or the metadata about video data 100. The server extracts content requested by a user, and provides the content to the user.

If the image processing apparatus 700 downloads information from the server via the communication network, the image processing apparatus 700 may further include a communicating unit (not shown) and a local storage (not shown). The communicating unit requests the video data and/or the metadata about video data 100 from the server via a wired or wireless communication network, and receives the video data and/or the metadata about video data 100 (hereinafter, referred to as 'the metadata 100') from the server. The local storage stores information downloaded from the server. The local storage according to the present embodiment stores the video data and/or the metadata 100 transmitted from the server via the communicating unit.

If the video data and/or the metadata 100 are recorded to the disc in the multiplexed or independent manner, when the disc having the video data and/or the metadata 100 is loaded in the image processing apparatus 700, the video data decoding unit 710 and the metadata analyzing unit 720 respectively read the video data and the metadata 100 from the disc. The metadata 100 may be recorded in a lead-in area, a user data area, and/or a lead-out area of the disc. If the video data is recorded to the disc, the metadata analyzing unit 720 extracts a disc identifier identifying the disc having the video data, and a title identifier indicating a title including the video data in the disc from the metadata 100, and determines which video data is related to the metadata 100 based on the disc identifier and the title identifier.

The metadata analyzing unit 720 extracts an output time of a frame including an object from the metadata 100, and when an output time of a current frame is included in the output time of the frame including the object, the metadata analyzing unit 720 parses background depth information and object depth information about the current frame and transmits the background depth information and the object depth information to the depth map generating unit 740.

When information about a mask is defined as area identification information with respect to an object included in a frame that is currently being output, the mask buffer 730 temporarily stores the mask to be applied to the frame. The mask may have different colors for a shape of the object and for a residual area of the frame except for the shape of the object. In other cases, a series of holes along an area of the object may be included in the mask. One mask may be necessary for one object.

The depth map generating unit 740 generates a depth map about the frame based on the background depth information and the object depth information received from the metadata analyzing unit 720, and the mask received from the mask buffer 730. The depth map generating unit 740 generates a depth map about the background and a depth map about the object based on the metadata 100, combines the depth map about the background with the depth map about the object, and thus generates the depth map about the frame.

The depth map generating unit 740 identifies an area of the object based on the area identification information included in the object depth information. As described above, the area identification information may be a value of a coordinate point indicating the area of the object, or may be the mask in which a shape of the object is marked. The depth map generating unit 740 recognizes the shape of the object based on information about the coordinate point or the mask, and gives a depth value to the recognized object.

If the object is a normal object, the depth map generating unit 740 extracts coordinate points from coordinate points in the area of the object and which is of a part contacting the background, and generates the depth map about the object based on depth values corresponding to the extracted coordinate points. If the object is a two-dimensional object, the depth map generating unit 740 generates a depth map about the two-dimensional object based on a panel position value. If the object is a highlight object, the depth map generating unit 740 generates a depth map about the highlight object based on an offset value and the panel position value.

The depth map generating unit 740 generates the depth map about the frame based on the depth map about the background and the depth map about the object. The depth map generating unit 740 transmits the generated depth map about the frame to the stereo rendering unit 750.

The stereo rendering unit 750 generates a left-eye image and a right-eye image based on a video image received from the video data decoding unit 710 and the depth map received from the depth map generating unit 740, and generates a three-dimensional format image including the left-eye image and the right-eye image.

Furthermore, an output device (not shown) may be included in the image processing apparatus 700. Hereinafter, it is assumed that the output device is included in the image processing apparatus 700 as the output unit 760. The output unit 760 sequentially outputs the left-eye image and the right-eye image on the screen. With respect to one eye, when images are output at a minimum frame rate of 60 Hz, a viewer visually senses that the images are sequentially and seamlessly reproduced. Therefore, in order to allow images input via the left/right eyes of the viewer to be combined and then to be recognized as a three-dimensional image by the viewer, the output unit 760 should output the images at a minimum frame rate of 120 Hz. The output unit 760 sequentially displays the left-eye image and the right-eye image, which are included in the frame, by a unit of $\frac{1}{120}$ sec.

Figure 8:
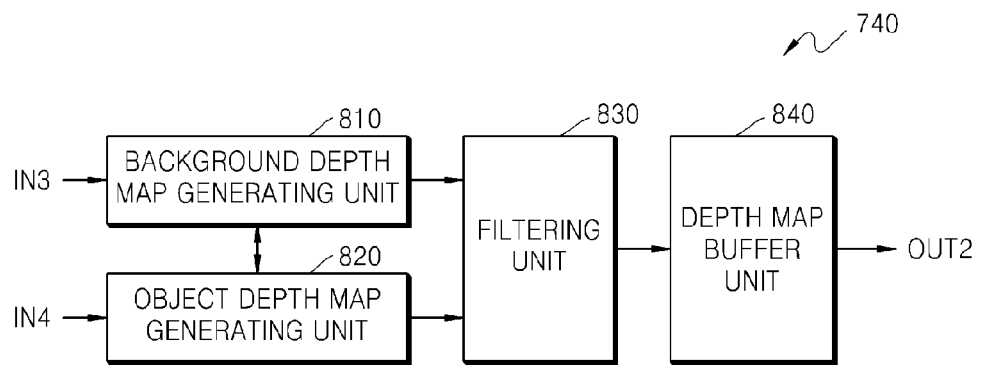
FIG. 8 is a detailed diagram of a depth map generating unit in the image processing apparatus of FIG. 7.

FIG. 8 is a detailed block diagram of the depth map generating unit 740 in the image processing apparatus 700 of FIG. 7. The depth map generating unit 740 includes a background depth map generating unit 810, an object depth map generating unit 820, a filtering unit 830, and a depth map buffer unit 840.

The background depth map generating unit 810 receives the background depth information from the metadata analyzing unit 720. The background depth information includes background type information, coordinate points of a background, depth values corresponding to the coordinate points of the background, and a panel position value, and generates the depth map about the background based on the background depth information. The background depth map generating unit 810 transmits the depth map about the background to the filtering unit 830.

The object depth map generating unit 820 receives object depth information including area identification information and object type information from the metadata analyzing unit 720, and generates the depth map about the object based on the object depth information. If the area identification information relates to a mask, the object depth map generating unit 820 receives the mask to be applied to a corresponding frame from the mask buffer 730, and generates the depth map about the object based on the mask.

If the object is a normal object, the object depth map generating unit 820 requests the background depth map generating unit 810 for a background depth value corresponding to a coordinate point of a position at which the object contacts the background. The object depth map generating unit 820 receives the background depth value corresponding to a coordinate point of the position at which the object contacts the background from the background depth map generating unit 810, and generates the depth map about the object based on the background depth value as a depth value of the object.

If the object is a two-dimensional object, the object depth map generating unit 820 requests the background depth map generating unit 810 for a panel position value, and generates the depth map about the two-dimensional object based on the panel position value. If the object is a highlight object, the object depth map generating unit 820 generates the depth map about the highlight object based on the panel position value received from the background depth map generating unit 810 and an offset value included in the object depth information. If a plurality of objects are included in a frame, the object depth map generating unit 820 sequentially generates depth maps about the plurality of objects according to priority order information.

The filtering unit 830 filters the depth map about the background and the depth map about the object. If pixels of the object have the same depth values, the filtering unit 830 may apply a filter to the depth map about the object so as to give a three-dimensional effect to the pixels of the object. If a shape of the depth map about the background is a plane, that is, if the entire background has the same depth value, the filter may be used to give a three-dimensional effect to the background.

The depth map buffer unit 840 temporarily stores the depth map about the background filtered by the filtering unit 830, and when the depth map about the object is generated, updates a depth map about a frame by adding the depth map about the object to the depth map about the background. If the object includes a plurality of objects, the depth map buffer unit 840 sequentially overlays the depth maps about the plurality of objects, and thus, updates the depth map about the frame. When the depth map about the frame is completed, the depth map buffer unit 840 transmits the depth map about the frame to the stereo rendering unit 750.

Figure 9:
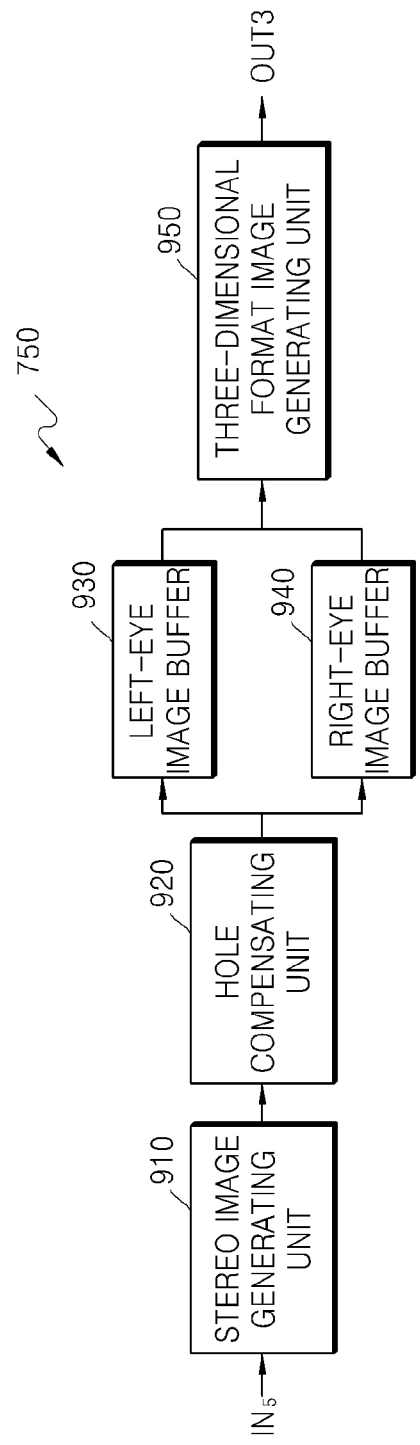
FIG. 9 is a detailed block diagram of a stereo rendering unit in the image processing apparatus of FIG. 7.

FIG. 9 is a detailed block diagram of the stereo rendering unit 750 in the image processing apparatus 700 of FIG. 7. The stereo rendering unit 750 includes a stereo image generating unit 910, a hole compensating unit 920, a left-eye image buffer 930, a right-eye image buffer 940, and a three-dimensional format image generating unit 950.

The stereo image generating unit 910 generates the left-eye image and the right-eye image based on the video image received from the video data decoding unit 710 and the depth map about the frame received from the depth map generating unit 740. The stereo image generating unit 910 calculates how far each pixel of a two-dimensional image should move in left and right directions based on the depth map about the frame, and generates the left-eye image and the right-eye image in which each of the pixels moves according to the calculation and is mapped to new positions.

The hole compensating unit 920 compensates for holes generated in the left-eye image and the right-eye image. When the left-eye image and the right-eye image are generated based on the two-dimensional image, the pixels of the two-dimensional image are repeatedly mapped to some positions in the left-eye image and the right-eye image while the pixels of the two-dimensional image are not mapped to some other positions which are thus empty; these empty positions are referred to as holes. The hole compensating unit 920 compensates for these holes in the left-eye image and the right-eye image, and then transmits the left-eye image to the left-eye image buffer 930 and the right-eye image to the right-eye image buffer 940.

The left-eye image buffer 930 and the right-eye image buffer 940 store the corresponding left-eye image and the right-eye image. When an image is to be output, the left-eye image buffer 930 and the right-eye image buffer 940 transmit the left-eye image and the right-eye image to the three-dimensional format image generating unit 950. The three-dimensional format image generating unit 950 generates the three-dimensional format image in such a manner that all of the left-eye image and the right-eye image may be included in the three-dimensional format image. The type of the three-dimensional format may be a top and down format, a side-by-side format, an interlaced format, etc. The three-dimensional format image generating unit 950 transmits the three-dimensional format image to the output device (not shown).

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image processing method, comprising:
    extracting shot information included in metadata of a video data, the shot information classifies frames of the video data into shot units, each shot unit being a group of frames having a similar composition with resect to a previous frame;
    determining whether frames of a predetermined shot can be reproduced as a three-dimensional image format based on shot type information included in the shot information, the shot type information indicates whether the frames of the predetermined shot need to be output as a two-dimensional image format or the three-dimensional image format;
    extracting background depth information from the metadata if the frames of the predetermined shot unit can be reproduced as the three-dimensional image format, wherein the background depth information relates to a background of the frames of the predetermined shot unit;
    generating a depth map about the background of the frames based on the background depth information;
    if the frames of the predetermined shot unit comprise an object, extracting object depth information about the object from the metadata; and
    generating a depth map about the object based on the object depth information.

2. The image processing method of claim 1, further comprising calculating a time at which the frames of the predetermined shot unit are required to be output based on the shot information.

3. The image processing method of claim 1, wherein the generating of the depth map about the background comprises extracting information from the background depth information, the information comprising background type information indicating a basic composition of the background, surface information for applying a depth value to a surface comprised in the background, coordinate points of the background, a depth value at each of the coordinate points of the background, and a panel position value indicating a depth value of a screen.

4. The image processing method of claim 3, wherein the generating of the depth map about the background comprises generating the depth map about the background based on a depth value of the basic composition of the background according to the background type information, and a depth value of the surface according to the surface information.

5. The image processing method of claim 3, further comprising:
    filtering the depth map about the background if the background of the frames have the same depth values;
    wherein the filtering of the depth map about the background comprises applying a hemisphere-shaped filter, a hemicylinder-shaped filter, or a triangular prism-shaped filter to the depth map about the background so as to modify the depth map about the background.

6. The image processing method of claim 1, wherein the object depth information comprises object type information identifying a type of the object from among a two-dimensional object, a normal object, and a highlight object.

7. The image processing method of claim 1, wherein:
    if a frame comprises a plurality of objects, the object depth information comprises priority order information indicating a depth map generation order for the plurality of objects; and
    the generating of the depth map about the object comprises sequentially generating depth maps about the plurality of objects according to the depth map generation order.

8. The image processing method of claim 1, wherein the generating of the depth map about the object comprises obtaining a time at which the frames comprising the object are required to be output based on the object depth information.

9. The image processing method of claim 1, further comprising:
- extracting area identification information identifying an area of the object from the object depth information;
- wherein the area identification information corresponds to information in which the area of the object is denoted as a coordinate point, or corresponds to a mask in which a shape of the object is marked.

10. The image processing method of claim 9, wherein, if the object is a two-dimensional object, the generating of the depth map about the object comprises generating a depth map about the two-dimensional object based on a depth value of the area of the object that is determined based on the panel position value comprised in the background depth information.

11. The image processing method of claim 9, wherein:
- if the object is a normal object and the area identification information corresponds to the mask in which the shape of the object is marked, the object depth information further comprises information about one or more background coordinate points from among coordinate points of the background included in the background depth information and which are equal to one or more coordinate points indicating an area of the normal object; and
- the generating of the depth map about the object comprises generating a depth map about the normal object based on depth values of the area of the normal object that are determined based on depth values of the one or more background coordinate points.

12. The image processing method of claim 9, wherein, if the object is a normal object, the generating of the depth map about the object comprises:
- obtaining one or more background coordinate points from among coordinate points of the background included in the background depth information and which are equal to coordinate points indicating an area of the normal object; and
- generating the depth map about the normal object based on depth values of the area of the normal object that are determined based on depth values of the background coordinate points.

13. The image processing method of claim 9, wherein, if the object is a highlight object, the generating of the depth map about the object comprises:
- calculating a depth value of an area of the highlight object based on the panel position value included in the background depth information and an offset value included in the object depth information; and
- generating a depth map about the highlight object based on the depth value of the area of the highlight object.

14. The image processing method of claim 13, further comprising:
- filtering the depth map about the object;
- wherein the filtering of the depth map about the object comprises applying a hemisphere-shaped filter, a hemicylinder-shaped filter, or a triangular prism-shaped filter to the depth map about the object so as to modify the depth map about the object.

15. The image processing method of claim 1, further comprising:
- extracting title identification information from the metadata;
- wherein the title identification information identifies a title comprising the frames, and thus determines which title is related to the metadata.

16. The image processing method of claim 1, further comprising:
- generating a left-eye image and a right-eye image with respect to the frames of the predetermined shot unit based on the depth map about the background and the depth map about the object;
- compensating for holes of the left-eye image and the right-eye image; and
- generating a image having the three-dimensional image format based on the compensated left-eye image and the compensated right-eye image.

17. An image processing apparatus, comprising:
- a metadata analyzing unit configured to extract shot information included in metadata of a video data, the shot information classifying frames of the video data into shot units, each shot unit being a group of frames having a similar composition with respect to a previous frame, to extract shot type information included in the shot information for determining whether frames of a predetermined shot unit can be reproduced as a three-dimensional image format, to extract background depth information from the metadata when frames of the predetermined shot unit can be reproduced as a three-dimensional image format, the background depth information relating to a background of the frames of the predetermined shot unit, and to extract and analyze object depth information about an object from the metadata when the frames of the predetermined shot unit include the object; and
- a depth map generating unit configured to generate a depth map about the background of the frames based on the background depth information, and configured to generate a depth map about the object based on the object depth information.

18. The image processing apparatus of claim 17, wherein the metadata analyzing unit calculates a time at which the frames of the predetermined shot unit are required to be output, based on the shot information.

19. The image processing apparatus of claim 17, wherein:
- the depth map generating unit extracts information from the background depth information to generate the depth map about the background; and
- the information extracted from the background depth information comprises background type information indicating a basic composition of the background, surface information for applying a depth value to a surface comprised in the background, coordinate points of the background, a depth value at each of the coordinate points of the background, and a panel position value indicating a depth value of a screen.

20. The image processing apparatus of claim 19, wherein the depth map generating unit generates the depth map about the background based on a depth value of the basic composition of the background according to the background type information, and a depth value of the surface according to the surface information.

21. The image processing apparatus of claim 19, further comprising:
- a filtering unit to filter the depth map;
- wherein, when the background of the frames have the same depth values, the filtering unit applies a hemisphere-shaped filter, a hemicylinder-shaped filter, or a triangular prism-shaped filter to the depth map about the background so as to filter the depth map about the background.

22. The image processing apparatus of claim 17, wherein the object depth information comprises object type information for identifying a type of the object from among a two-dimensional object, a normal object, and a highlight object.

23. The image processing apparatus of claim 17, wherein:
when a frame comprises a plurality of objects, the object depth information comprises priority order information indicating a depth map generation order for the plurality of objects, and
the depth map generating unit sequentially generates depth maps about the plurality of objects according to the depth map generation order.

24. The image processing apparatus of claim 17, wherein the depth map generating unit obtains a time at which the frames comprising the object are required to be output based on the object depth information.

25. The image processing apparatus of claim 17, wherein:
the depth map generating unit extracts area identification information identifying an area of the object from the object depth information, and
the area identification information corresponds to information in which the area of the object is denoted as a coordinate point, or corresponds to a mask in which a shape of the object is marked.

26. The image processing apparatus of claim 25, wherein, when the object is a two-dimensional object, the depth map generating unit generates a depth map about the two-dimensional object based on a depth value of the area of the object that is determined based on a panel position value included in the background depth information.

27. The image processing apparatus of claim 25, wherein:
when the object is a normal object and when the area identification information corresponds to the mask in which the shape of the object is marked, the object depth information further comprises information about one or more background coordinate points from among coordinate points of the background included in the background depth information and which are equal to coordinate points indicating an area of the normal object; and
the depth map generating unit generates a depth map about the normal object based on depth values of the area of the normal object that are determined based on depth values of the one or more background coordinate points.

28. The image processing apparatus of claim 25, wherein, when the object is a normal object, the depth map generating unit obtains one or more background coordinate points from among coordinate points of the background included in the background depth information and which are equal to coordinate points indicating an area of the normal object, and generates a depth map about the normal object based on depth values of the area of the normal object that are determined based on depth values of the background coordinate points.

29. The image processing apparatus of claim 25, wherein, when the object is a highlight object, the depth map generating unit generates a depth map about the highlight object based on a depth value of an area of the highlight object, wherein the depth value is calculated based on a panel position value comprised in the background depth information and an offset value included in the object depth information.

30. The image processing apparatus of claim 29, further comprising:
a filtering unit configured to filter the depth map about the object, and
wherein the filtering unit applies a hemisphere-shaped filter, a hemicylinder-shaped filter, or a triangular prism-shaped filter to the depth map about the object to filter the depth map about the object.

31. The image processing apparatus of claim 17, wherein:
the metadata analyzing unit extracts title identification information from the metadata; and
the title identification information identifies a title comprising the frames, and determines which title is related to the metadata based on the title identification information.

32. The image processing apparatus of claim 17, further comprising:
a stereo image generating unit configured to generate a left-eye image and a right-eye image with respect to the frames of the predetermined shot unit based on the depth map about the background and the depth map about the object;
a hole compensating unit configured to compensate for holes of the left-eye image and the right-eye image; and
a three-dimensional format image generating unit configured to generate a image having the three-dimensional image format by using the left-eye image and the right-eye image of which compensates for holes.

33. A non-transitory recording medium storing a computer readable program to execute the image processing method of claim 1.

34. The image processing apparatus of claim 17, wherein the depth map generating unit further comprises:
a background depth map generating unit to generate the depth map about the background of the frames based on the background depth information;
an object depth map generating unit to generate the depth map about the object based on the object depth information;
a filtering unit to apply a filter to the depth map about the background and/or the depth map about the object; and
a depth map buffer unit to temporarily store the depth map about the background and to generate a depth map for the frame based on the filtered depth map about the background and the filtered depth map about the object.

* * * * *